(12) United States Patent
Noh et al.

(10) Patent No.: US 10,903,952 B2
(45) Date of Patent: Jan. 26, 2021

(54) METHOD AND DEVICE FOR RECEIVING SIGNAL IN WIRELESS ACCESS SYSTEM SUPPORTING FDR TRANSMISSION

(71) Applicant: LG ELECTRONICS INC., Seoul (KR)

(72) Inventors: Kwangseok Noh, Seoul (KR); Jinmin Kim, Seoul (KR); Kukheon Choi, Seoul (KR); Jaehoon Chung, Seoul (KR); Kitae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 15/501,754

(22) PCT Filed: Aug. 6, 2014

(86) PCT No.: PCT/KR2014/007271
§ 371 (c)(1),
(2) Date: Feb. 3, 2017

(87) PCT Pub. No.: WO2016/021750
PCT Pub. Date: Feb. 11, 2016

(65) Prior Publication Data
US 2017/0230159 A1 Aug. 10, 2017

(51) Int. Cl.
*H04B 7/26* (2006.01)
*H04L 5/14* (2006.01)
(Continued)

(52) U.S. Cl.
CPC ............ *H04L 5/0048* (2013.01); *H04B 7/26* (2013.01); *H04B 15/00* (2013.01); *H04J 11/00* (2013.01); *H04L 5/0053* (2013.01); *H04L 5/14* (2013.01)

(58) Field of Classification Search
USPC .......................................................... 370/277
See application file for complete search history.

(56) References Cited

U.S. PATENT DOCUMENTS

2012/0063369 A1 3/2012 Lin et al.
2012/0263078 A1 10/2012 Tung
(Continued)

FOREIGN PATENT DOCUMENTS

CN 103120010 A 5/2013
CN 103516638 A 1/2014
(Continued)

*Primary Examiner* — Gregory B Sefcheck
*Assistant Examiner* — Majid Esmaeilian
(74) *Attorney, Agent, or Firm* — Dentons US LLP

(57) ABSTRACT

The present invention relates to a wireless access system supporting a full duplex radio (FDR) transmission environment. A method by which a first UE receives a signal from a base station in a wireless access system supporting FDR transmission, according to one embodiment of the present invention, can comprise the steps of: receiving a first reference signal from the base station; calculating first channel information on self-interference by using the first reference signal; receiving a second reference signal from the base station, and receiving a third reference signal from a second UE at the same time as the second reference signal; calculating second channel information from which the self-interference is cancelled, on the basis of the second reference signal, the third reference signal and the first channel information; and receiving the signal by using the second channel information and third channel information on a channel receiving the signal.

6 Claims, 18 Drawing Sheets

(51) Int. Cl.
*H04L 5/00* (2006.01)
*H04J 11/00* (2006.01)
*H04B 15/00* (2006.01)

(56) References Cited

U.S. PATENT DOCUMENTS

| | | | |
|---|---|---|---|
| 2012/0263210 A1* | 10/2012 | Panah | H04B 7/0417 |
| | | | 375/211 |
| 2013/0051288 A1* | 2/2013 | Yamada | H04W 8/24 |
| | | | 370/280 |
| 2013/0114468 A1* | 5/2013 | Hui | H04B 17/345 |
| | | | 370/277 |
| 2013/0155913 A1 | 6/2013 | Sarca | |
| 2014/0112177 A1 | 4/2014 | Park et al. | |
| 2014/0146765 A1* | 5/2014 | Ji | H04W 72/082 |
| | | | 370/329 |
| 2014/0348018 A1* | 11/2014 | Bharadia | H04L 5/1423 |
| | | | 370/252 |
| 2015/0016309 A1* | 1/2015 | Fang | H04J 11/0023 |
| | | | 370/277 |
| 2018/0241522 A1* | 8/2018 | Karout | H04B 7/0413 |

FOREIGN PATENT DOCUMENTS

| | | |
|---|---|---|
| WO | 2012115330 A1 | 8/2012 |
| WO | 2012153988 A2 | 11/2012 |
| WO | 2013173250 A1 | 11/2013 |

* cited by examiner

FIG. 5
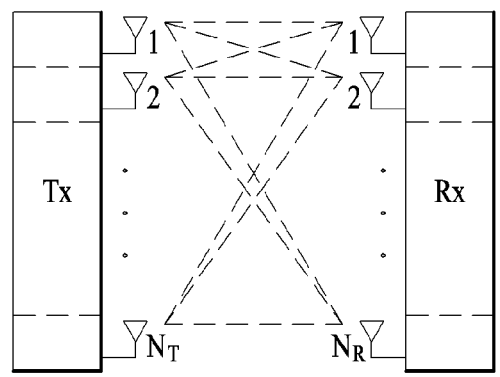
(a)
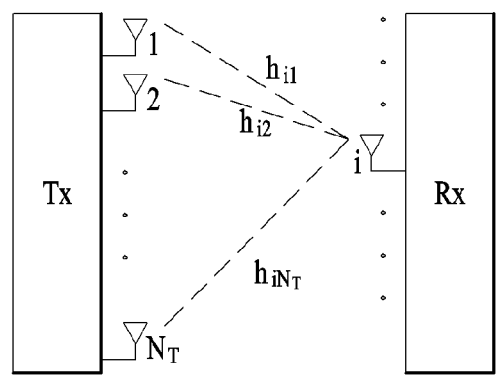
(b)

METHOD AND DEVICE FOR RECEIVING SIGNAL IN WIRELESS ACCESS SYSTEM SUPPORTING FDR TRANSMISSION

This application is a National Stage Application of International Application No. PCT/KR2014/007271, filed on Aug. 6, 2014, which is hereby incorporated by reference in its entirety for all purposes as if fully set forth herein.

TECHNICAL FIELD

The present invention relates to a wireless access system supporting a Full Duplex Radio (FDR) transmission environment and, more particularly, to a method for efficiently transmitting and receiving a signal when FDR is applied and an apparatus supporting the same.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE OF THE INVENTION

Technical Problem

An object of the present invention is to provide methods for efficiently transmitting and receiving a signal in a wireless access system supporting FDR transmission.

Another object of the present invention is to provide an apparatus supporting the above methods.

The technical objects that can be achieved through the present invention are not limited to what has been particularly described hereinabove and other technical objects not described herein will be more clearly understood by persons skilled in the art from the following detailed description.

Technical Solution

To achieve these and other advantages and in accordance with the purpose of the present invention, as embodied and broadly described, according to one embodiment, a method of receiving a signal, which is received by a first terminal from a base station in a wireless access system supporting FDR (full duplex radio) transmission, includes the steps of receiving a first reference signal from the base station, calculating first channel information on self-interference using the first reference signal, receiving a second reference signal from the base station and simultaneously receiving a third reference signal from a second terminal at the time of receiving the second reference signal, calculating second channel information from which the self-interference is cancelled based on the second reference signal, the third reference signal, and the first channel information, and receiving the signal using third channel information on a channel on which the signal is received and the second channel information.

To further achieve these and other advantages and in accordance with the purpose of the present invention, according to a different embodiment, a terminal receiving a signal from a base station in a wireless access system supporting FDR (full duplex radio) transmission includes an RF unit and a processor, the processor configured to receive a first reference signal from the base station, the processor configured to calculate first channel information on self-interference using the first reference signal, the processor configured to receive a second reference signal from the base station and simultaneously receive a third reference signal from a second terminal at the time of receiving the second reference signal, the processor configured to calculate second channel information from which the self-interference is cancelled based on the second reference signal, the third reference signal, and the first channel information, the processor configured to receive the signal using third channel information on a channel on which the signal is received and the second channel information.

Following items can be commonly applied to the embodiments according to the present invention.

The second reference signal and the third reference signal can be transmitted from a different frequency resource and a time resource.

The second reference signal is transmitted from a part of resources in which a CRS (common reference signal) is transmitted and the third reference signal can be transmitted from the remaining resources.

The third reference signal is transmitted from a part of resources in which a DM-RS (demodulation reference signal) is transmitted and the third reference signal can be transmitted from the remaining resources.

The second reference signal and the third reference signal can be assigned to a radio resource to make the second channel information has a value close to the first channel information.

The second reference signal and the third reference signal can be assigned to a radio resource to make the second channel information has a value close to the third channel information.

The method can further include the steps of receiving a UE capability request message and transmitting a UE capability information message including a field indicating whether or not the FDR transmission is supported.

The foregoing general description and following detailed description of the present invention are exemplary and explanatory and are intended to provide further explanation of the invention claimed.

Advantageous Effects

According to embodiments of the present invention, the following effects can be obtained.

First, a signal can be efficiently transmitted and received in a wireless access system in a wireless access system supporting FDR transmission.

Effects according to the present invention are not limited to what has been particularly described hereinabove and other advantages not described herein will be more clearly understood by persons skilled in the art from the following detailed description of the present invention. That is, unin-

DESCRIPTION OF DRAWINGS

FIG. 5 illustrates the structure of a downlink radio frame used in an LTE system.

BEST MODE

Mode for Invention

Figure 1:
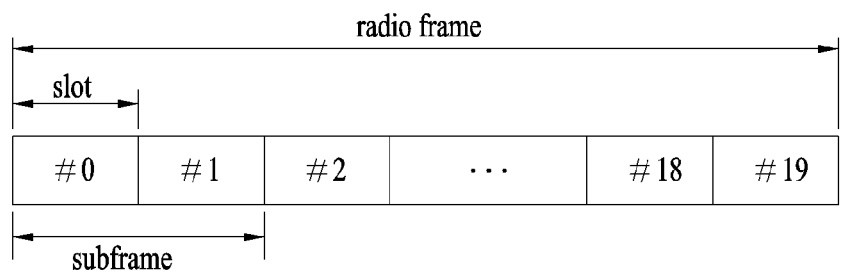
FIG. 1 illustrates a network structure of an E-UMTS as an exemplary wireless communication system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1 is a diagram illustrating the structure of the type 1 radio frame. A downlink radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or symbol duration. An RB is a resource allocation unit including a plurality of contiguous subcarriers in one slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce interference between symbols.

In case of a normal CP, since one slot includes seven OFDM symbols, one subframe includes 14 OFDM symbols. The first two or three 01-DM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in a radio frame, the number of slots included in a subframe or the number of symbols included in a slot may be changed in various manners.

Figure 2:
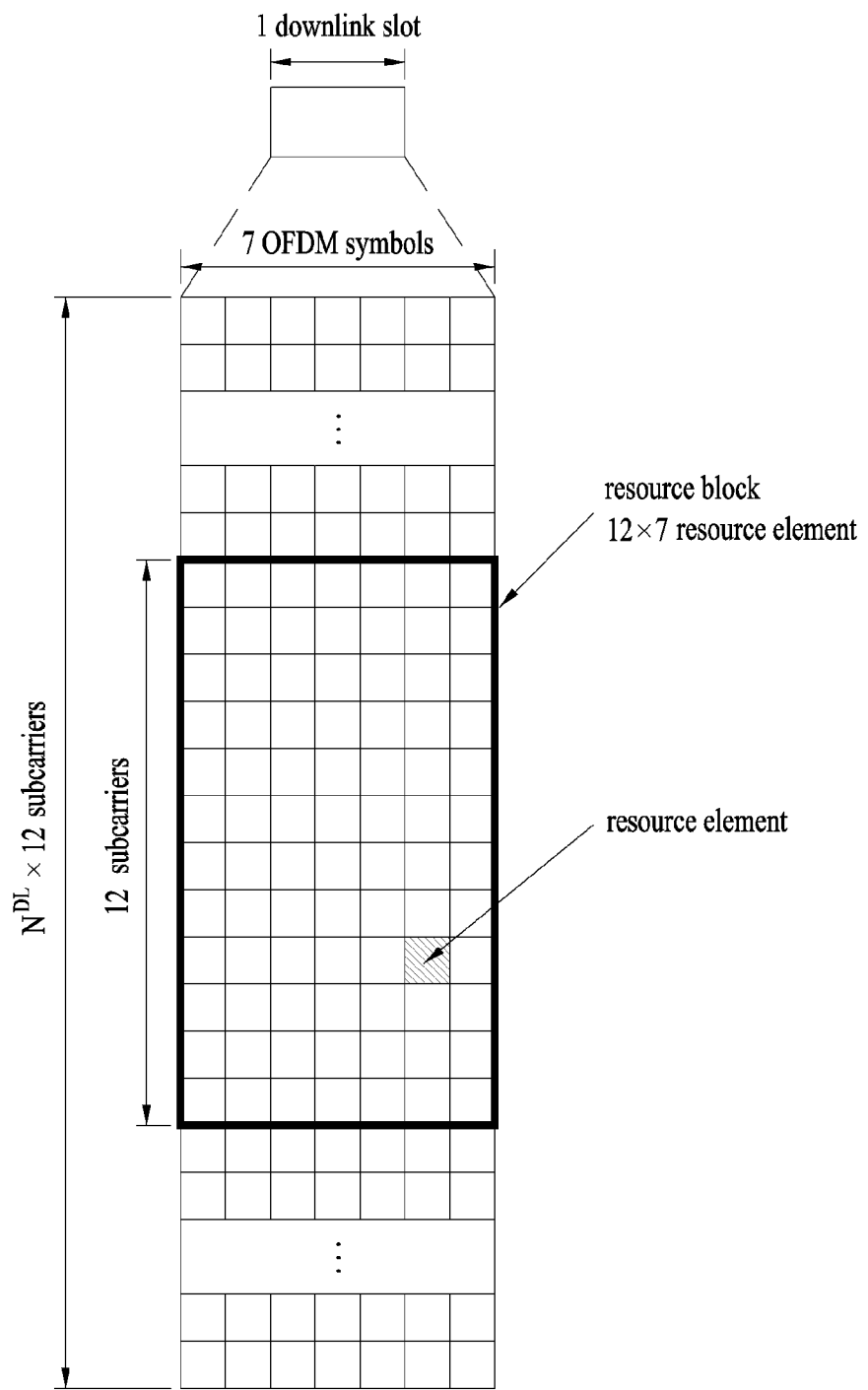
FIG. 2 illustrates a control plane and a user plane of a radio interface protocol architecture between a UE and an E-UTRAN based on a 3GPP radio access network standard.

FIG. 2 is a diagram illustrating an example of a resource grid in one downlink slot. OFDM symbols are configured by the normal CP. Referring to FIG. 2, the downlink slot includes a plurality of OFDM symbols in the time domain and includes a plurality of RBs in the frequency domain. Although FIG. 2 exemplarily depicts that one downlink slot includes seven OFDM symbols and one RB includes 12 subcarriers, the present invention is not limited thereto. Each element of the resource grid is referred to as a Resource Element (RE). For example, an RE a(k,l) is located at a kth subcarrier and an lth OFDM symbol. In case of a normal CP, one RB includes 12 ☐7 REs (in case of an extended CP, one RB includes 12 ☐6 REs). Since the spacing between subcarriers is 15 kHz, one RB is about 180 kHz in the frequency domain. NDL denotes the number of RBs included in the downlink slot. NDL is determined based on a downlink transmission bandwidth set through Node B scheduling.

Figure 3:
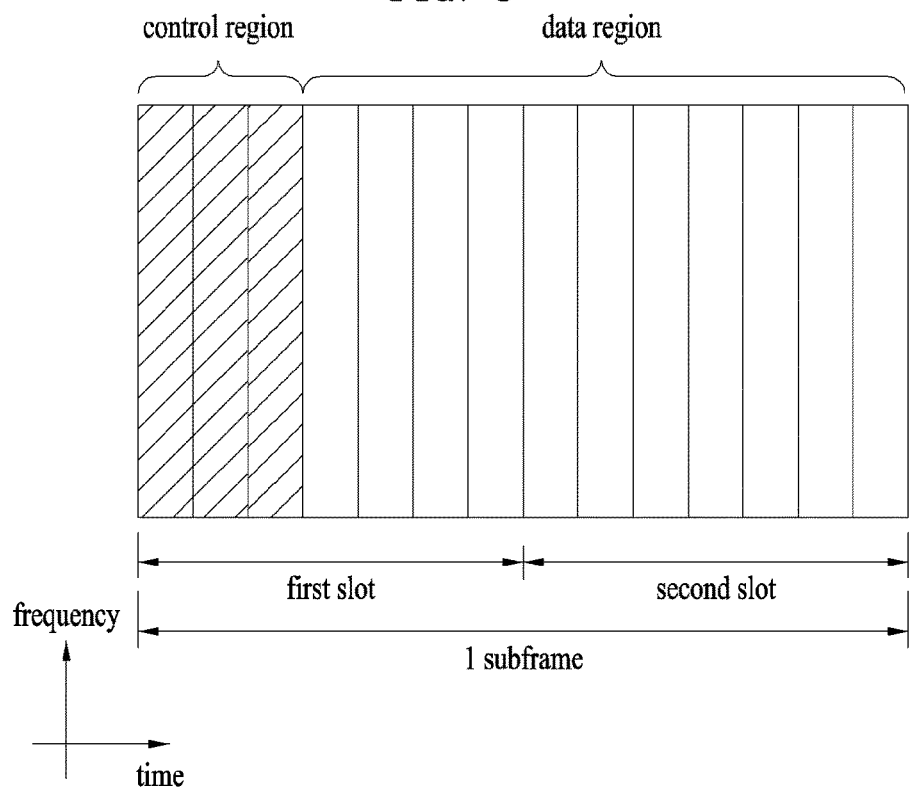
FIG. 3 illustrates physical channels used in a 3GPP system and a general signal transmission method using the same.

FIG. 3 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. A basic transmission unit is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

Figure 4:
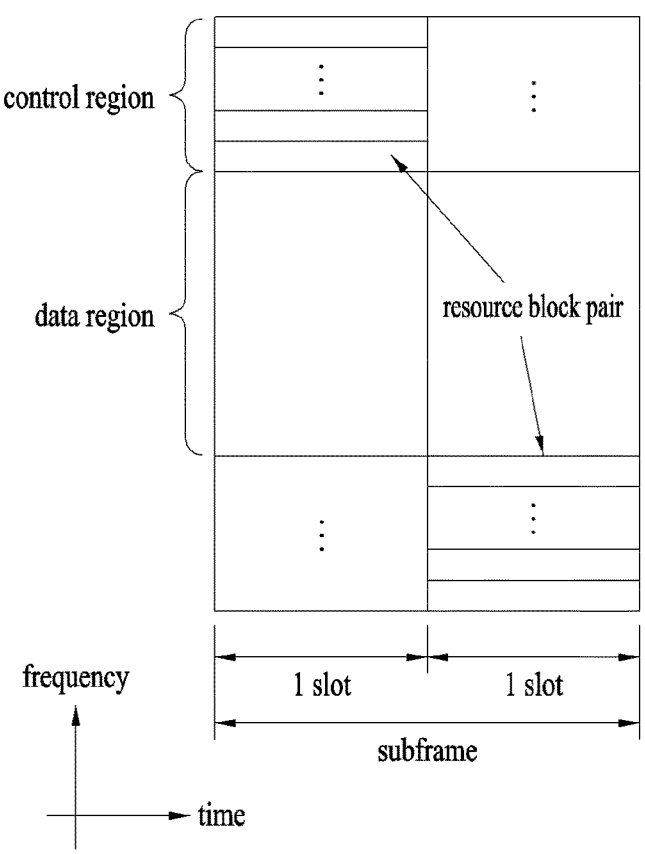
FIG. 4 illustrates the structure of a radio frame used in an LTE system.

FIG. 4 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multiple Input Multiple Output (MIMO) System

The MIMO system increases data transmission/reception efficiency using a plurality of Tx antennas and a plurality of Rx antennas. MIMO is an application of putting data segments received from a plurality of antennas into a whole message, without depending on a single antenna path to receive the whole message.

MIMO schemes are classified into spatial diversity and spatial multiplexing. Spatial diversity increases transmission reliability or a cell radius using diversity gain and thus is suitable for data transmission for a fast moving UE. In spatial multiplexing, multiple Tx antennas simultaneously transmit different data and thus high-speed data can be transmitted without increasing a system bandwidth.

FIG. 5 illustrates the configuration of a wireless communication system supporting multiple antennas. Referring to FIG. 5(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas will be described in detail through mathematical modeling.

Regarding a transmission signal, up to NT pieces of information can be transmitted through the NT Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmit power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector S may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Here, $w_{ij}$ denotes a weight between a jth piece of information and an ith Tx antenna and W is a precoding matrix.

The transmitted signal x may be differently processed using according to two schemes (for example, spatial diversity and spatial multiplexing). In spatial multiplexing, different signals are multiplexed and transmitted to a receiver such that elements of information vector(s) have different values. In spatial diversity, the same signal is repeatedly transmitted through a plurality of channel paths such that elements of information vector(s) have the same value. Spatial multiplexing and spatial diversity may be used in combination. For example, the same signal may be transmitted through three Tx antennas in spatial diversity, while the remaining signals may be transmitted to the receiver in spatial multiplexing.

Given NR Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a jth Tx antenna and an ith Rx antenna is denoted by hij. Notably, the index of an Rx antenna precedes the index of a Tx antenna in hij.

FIG. 5(b) illustrates channels from NT Tx antennas to an ith Rx antenna. The channels may be collectively represented as a vector or a matrix. Referring to FIG. 5(b), the channels from the NT Tx antennas to the ith Rx antenna may be expressed as $$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN added to the NR Rx antennas is given as the following vector.

$$n = [n_1, n_2, \ldots, n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The numbers of rows and columns in the channel matrix H representing channel states are determined according to the numbers of Rx and Tx antennas. Specifically, the number of rows in the channel matrix H is equal to the number of Rx antennas, NR and the number of columns in the channel matrix H is equal to the number of Tx antennas, NT. Hence, the channel matrix H is of size NR×NT.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

In MIMO transmission, the term "rank" denotes the number of paths for independently transmitting signals, and the term "number of layers" denotes the number of signal streams transmitted through respective paths. In general, since a transmitter transmits as many layers as the number of ranks used for signal transmission, the rank has the same meaning as the number of layers unless otherwise noted.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
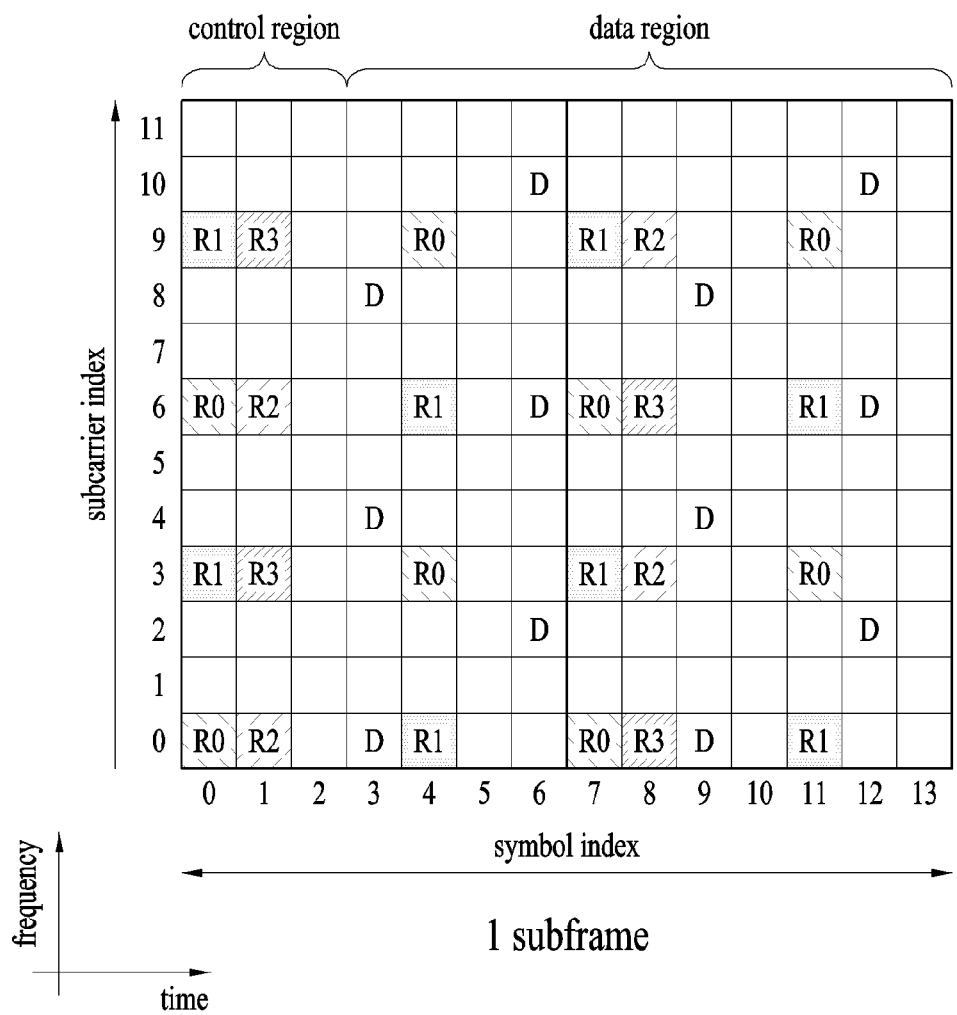
FIG. 6 illustrates the structure of an uplink subframe used in an LTE system.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a Modulation and Coding Scheme (MCS), a Precoding Matrix Index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
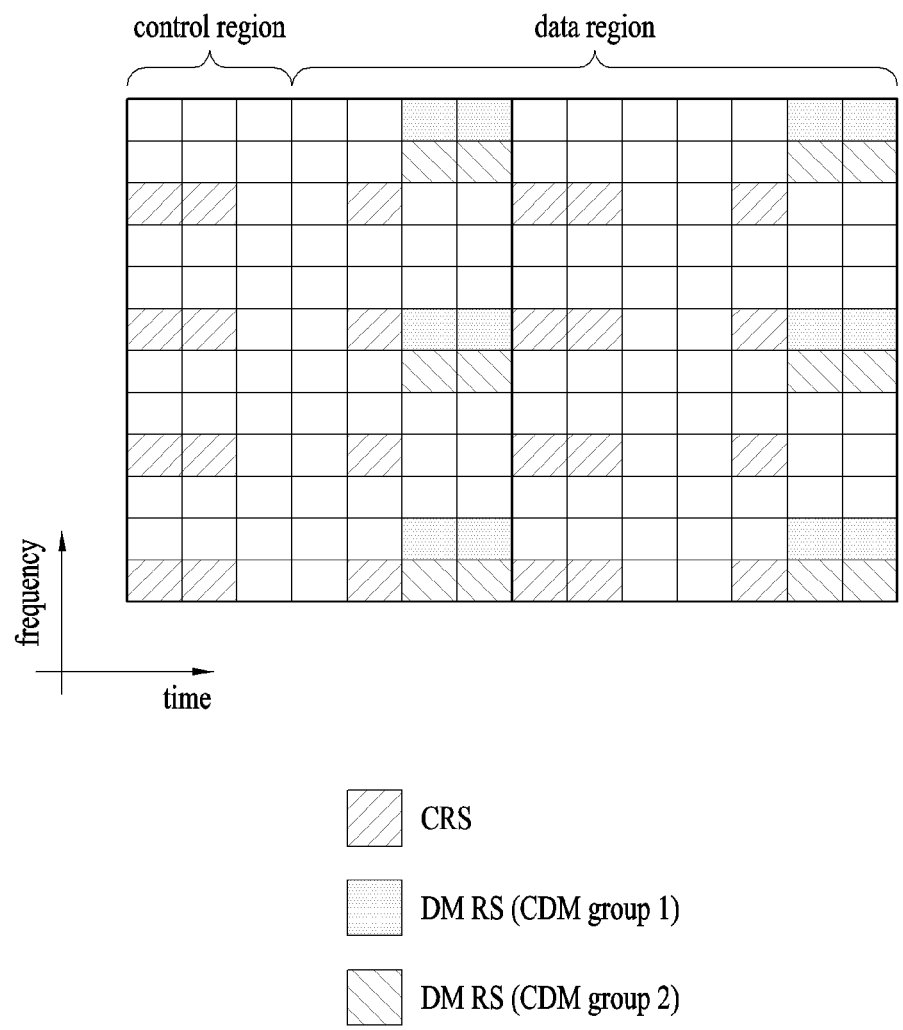
FIG. 7 illustrates the configuration of a general MIMO communication system.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in Frequency Division Multiplexing (FDM) and/or Time Division Multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
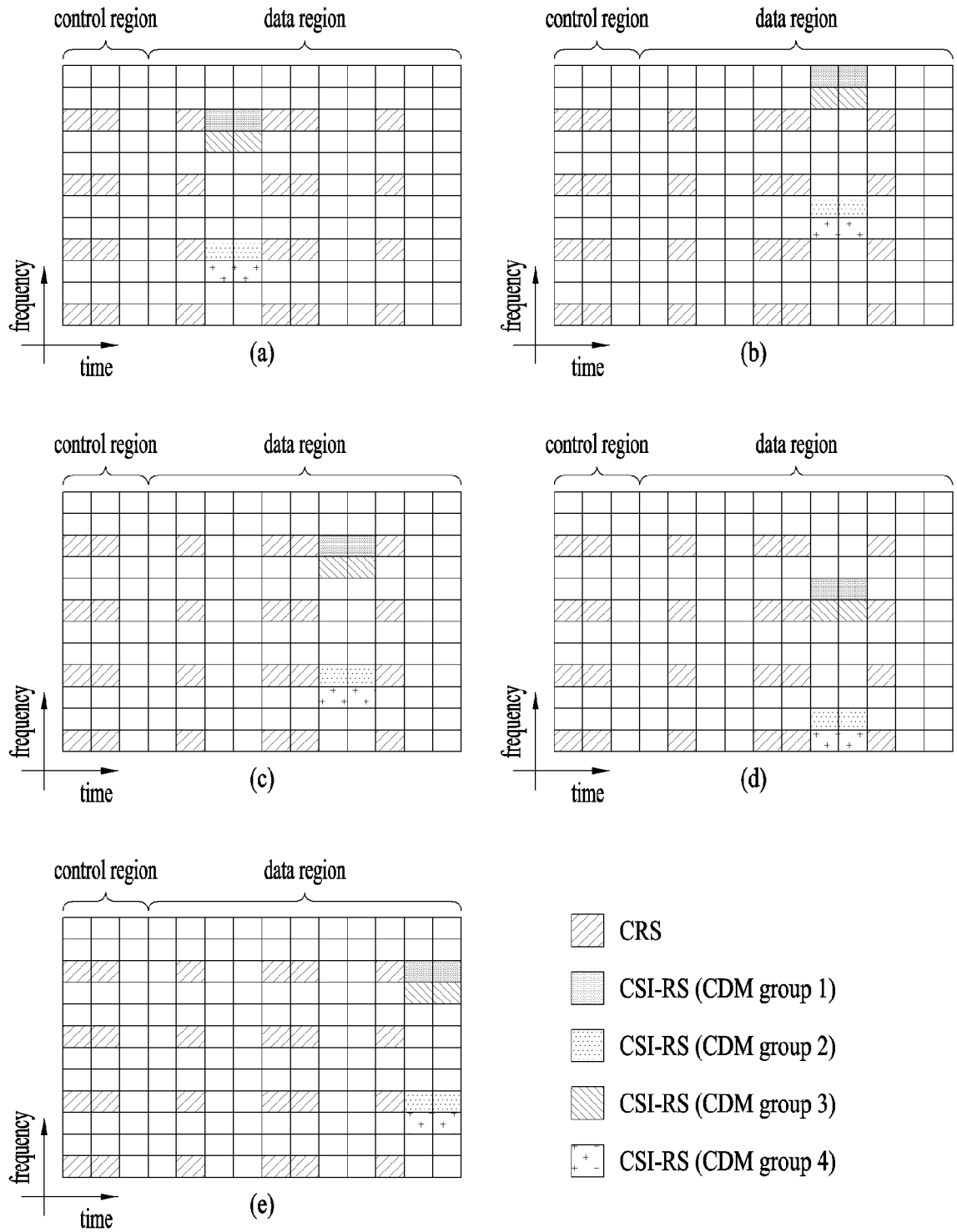
FIGS. 8 and 9 illustrate periodic reporting of channel state information.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
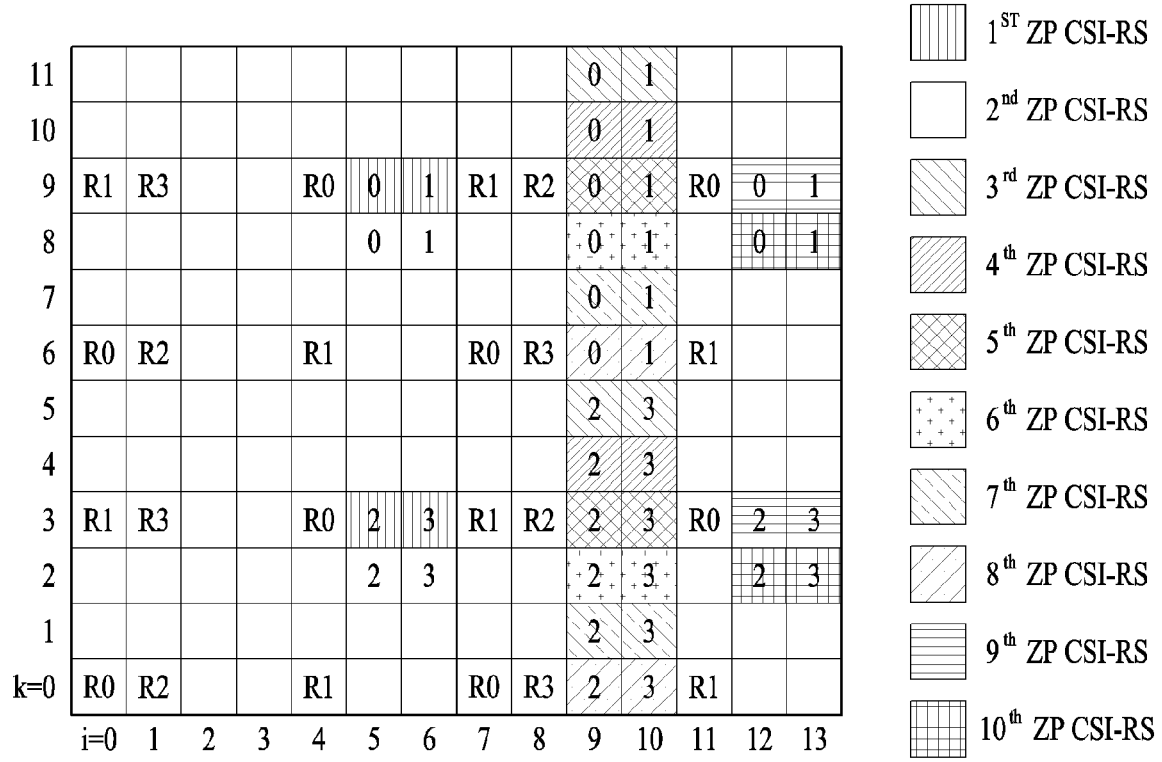

FIG. 9 is a diagram illustrating an exemplary Zero-Power (ZP) CSI-RS pattern defined in an LTE-A system. A ZP CSI-RS is largely used for two purposes. First, the ZP CSI-RS is used to improve CSI-RS performance That is, one network may mute a CSI-RS RE of another network in order to improve CSI-RS measurement performance of the other network and inform a UE thereof of the muted RE by setting the muted RE to a ZP CSI-RS so that the UE may correctly perform rate matching. Second, the ZP CSI-RS is used for interference measurement for CoMP CQI calculation. That is, some networks may mute a ZP CRS-RS RE and a UE may calculate a CoMP CQI by measuring interference from the ZP CSI-RS.

The RS patterns of FIGS. 6 to 9 are purely exemplary and an RS pattern applied to various embodiments of the present invention is not limited to such specific RS patterns. In other words, even when an RS pattern different from the RS patterns of FIGS. 6 to 9 is defined and used, various embodiments of the present invention may be identically applied.

Full Duplex Radio (FDR) Transmission

PDR refers to transmission and reception technology in which an eNB and/or a UE support transmission without separately performing uplink/downlink duplexing in frequency/time, etc.

Figure 10:
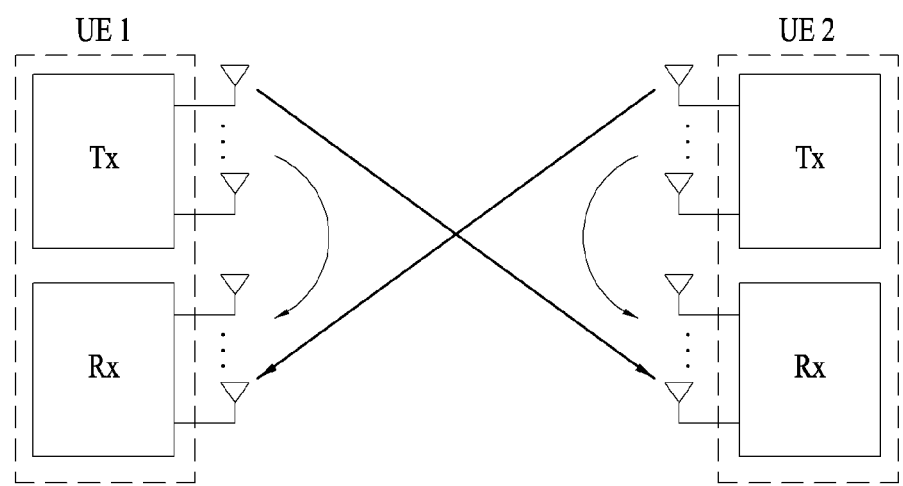
FIG. 10 illustrates an exemplary interference situation in an FDR scheme.

FIG. 10 is a diagram illustrating an exemplary interference situation in an FDR scheme.

Referring to FIG. 10, UE 1 and UE 2 perform communication on uplink/downlink using the same frequency/time resource. Accordingly, each UE may perform transmission and simultaneously receive a signal from another eNB or UE. That is, as illustrated in dotted lines of FIG. 10, a communication environment in which a transmission signal of a device is received by a reception module (or a receiver) of the device to directly cause self-interference is formed.

When a multi-cell deployment environment is considered in a system, new interference or increased interference, which is expected due to introduction of FDR, is summarized as follows.

(1) Self-interference (Intra-device self-interference)

(2) Multi-user interference (UE to UE inter-link interference)

(3) Inter-cell interference (BS to BS inter-link interference)

Self-interference indicates that a signal transmitted from a device directly causes interference with respect to a receiver of the device as illustrated in FIG. Generally, a self-interference signal is received with a higher power than a desired signal. Therefore, it is important to perfectly cancel self-interference through an interference cancellation operation.

Second, multi-user interference refers to interference occurring between UEs. For example, multi-user interference indicates that a signal transmitted by a UE is received by an adjacently located UE, thereby acting as interference. In a legacy communication system, since a half-duplex mode (e.g., FDD or TDD) in which uplink or downlink transmission is separately performed in frequency or time is implemented, interference does not occur between uplink and downlink. However, an FDR transmission environment in which uplink and downlink share the same frequency/time resource causes interference between an eNB that transmits data and adjacent UEs as illustrated in FIG. 10.

Lastly, inter-cell interference represents interference occurring between eNBs. For example, inter-cell interference indicates that a signal transmitted by one eNB in a heterogeneous eNB situation is received by a reception antenna of another eNB, thereby acting as interference. This interference represents the same communication situation as multi-user interference and occurs by sharing uplink and downlink resources between eNBs. That is, although FDR can increase frequency efficiency by sharing the same time/frequency resources in uplink and downlink, increased interference may restrict frequency efficiency improvement.

Among the above three types of interference, (1) self-interference should be solved first for FDR operation due to affect of interference occurring only in FDR. FIG. 10 shows exemplary FDR in a self-interference situation. In more detail, a signal transmitted by one UE is received by a reception antenna of the same UE, thereby acting as interference.

Such self-interference has unique characteristics as opposed to other interference.

First, a signal serving as interference may be regarded as a perfectly known signal.

Figure 11:
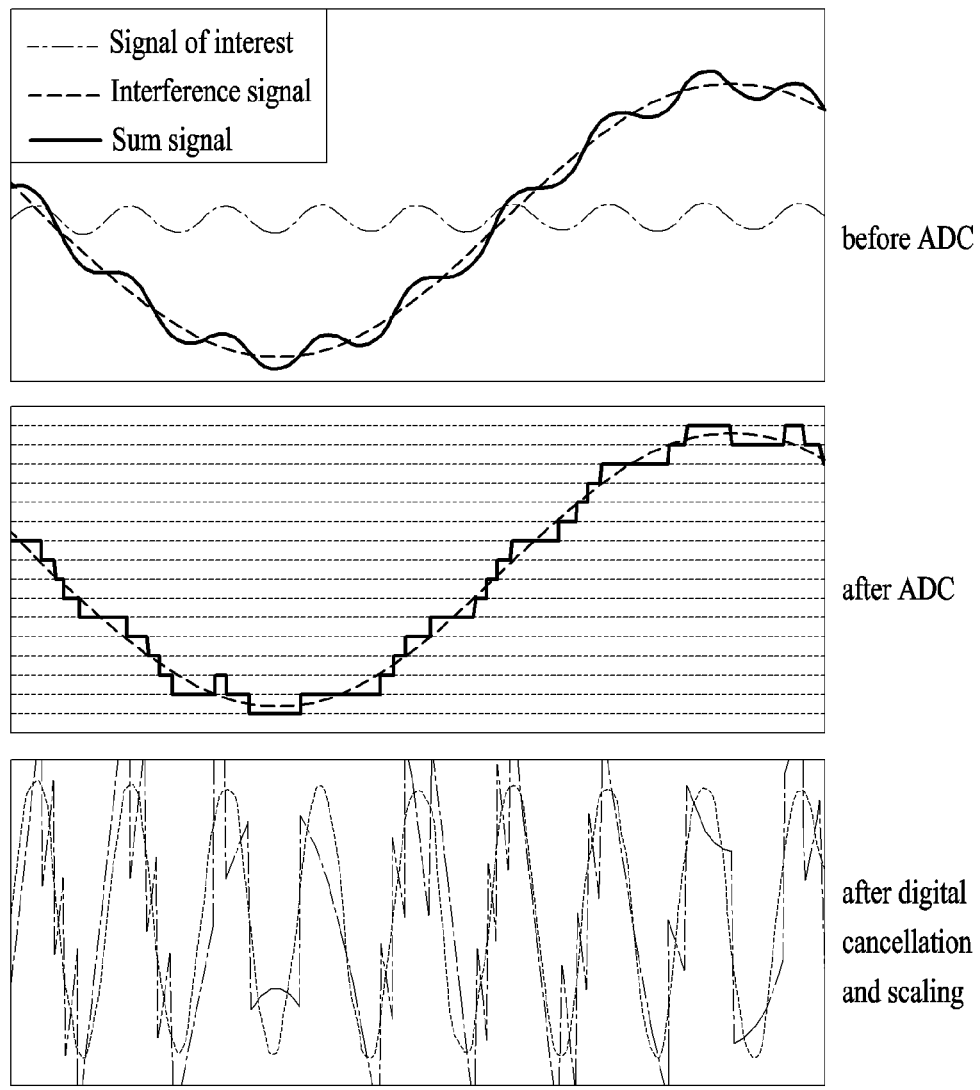
FIG. 11 illustrates exemplary interference signal cancellation when power of an interference signal is much higher than power of a desired signal.

Second, power of a signal serving as interference is considerably higher than power of a desired signal. Accordingly, even if a signal serving as interference is perfectly known, a receiver cannot perfectly cancel interference. The receiver uses an Analog-to-Digital Converter (ADC) to convert a received signal into a digital signal. Generally, the ADC measures power of a received signal to adjust a power level of the received signal, quantizes the power-adjusted received signal, and converts the quantized signal into a digital signal. However, if an interference signal is received at a remarkably higher power relative to a desired signal, characteristics of the desired signal are covered by a quantization level during quantization and thus the received signal may not be restored. FIG. 11 is a diagram illustrating distortion of a desired signal even after cancellation of an interference signal during quantization is performed when power of the interference signal is much higher than power of the desired signal and FIG. 12 is a diagram illustrating restoration of a desired signal after an interference signal is cancelled when power of the interference signal is lower than power of the desired signal.

Figure 12:
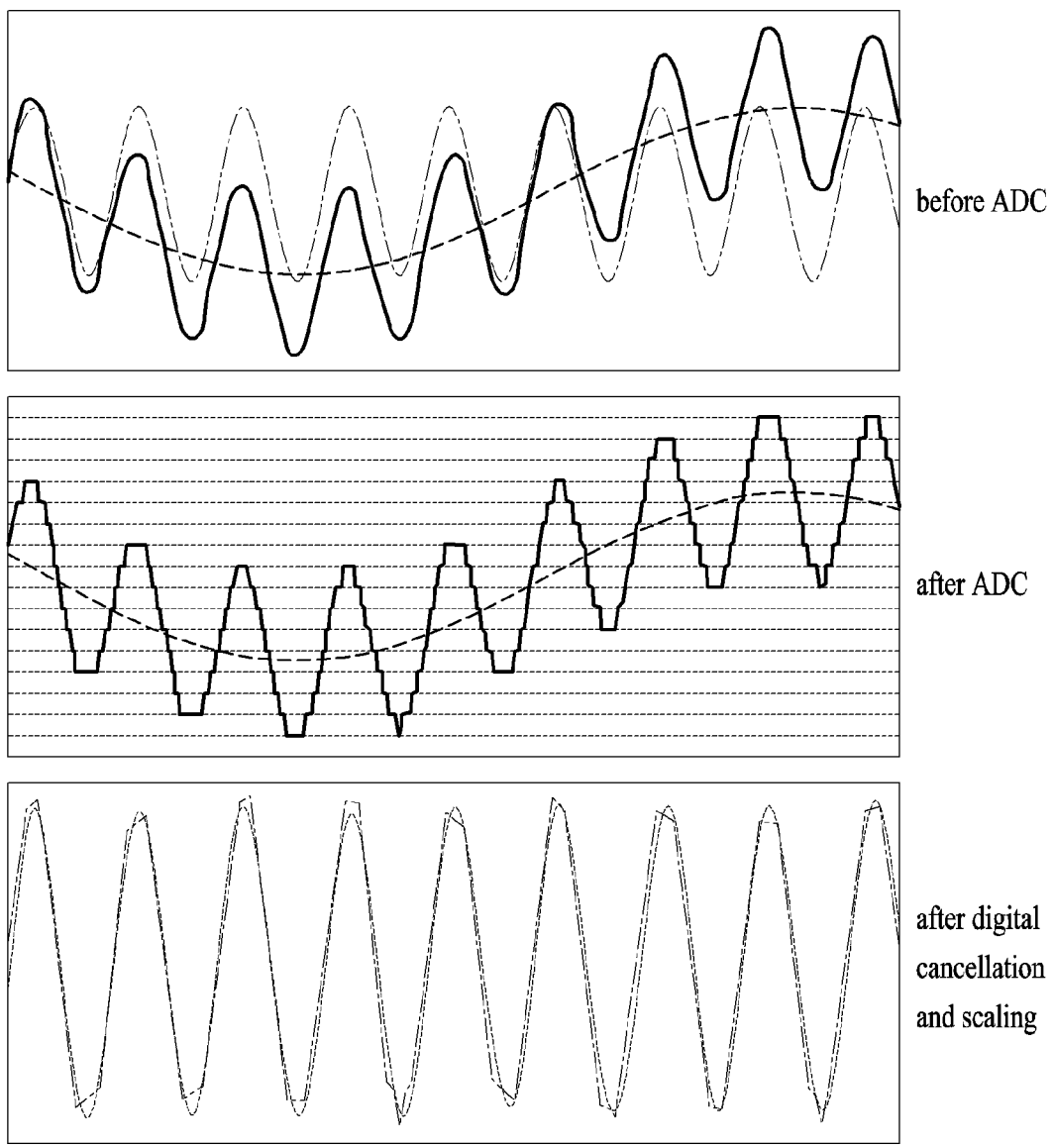
FIG. 12 illustrates an example of the case in which power of an interference signal is lower than power of a desired signal.
Figure 13:
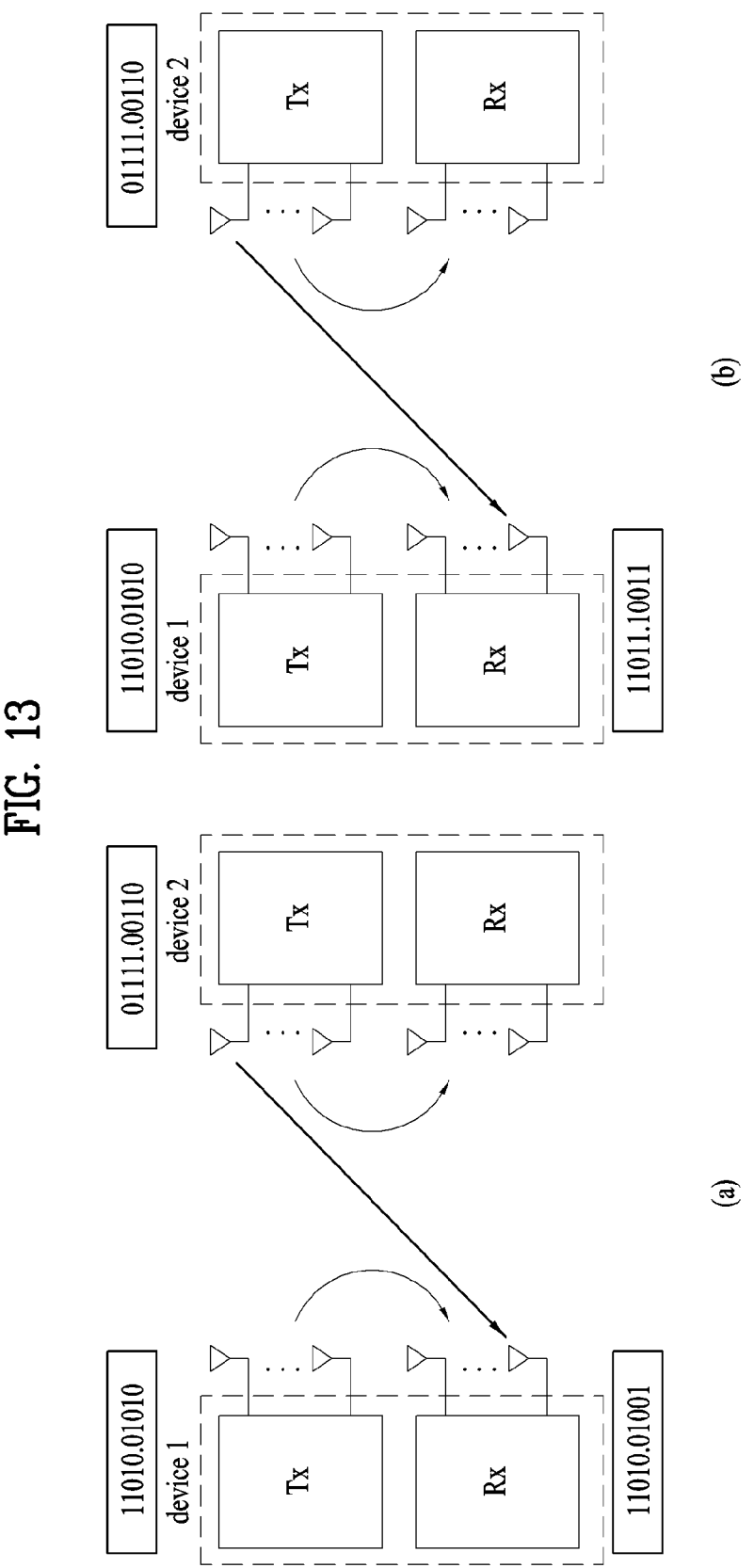
FIG. 13 illustrates an example of a baseband signal after ADC according to a size of self-interference which is remained after an analog cancellation method is used.

As can be seen from FIGS. 11 and 12, when self-interference is properly cancelled, the desired signal may be well received FIG. 13 illustrates an example of a baseband signal after ADC according to a size of self-interference which is remained after an analog cancellation method is used. Specifically, FIG. 13 illustrates a baseband signal after signals transmitted by a transmission device 1 and a transmission device 2 are received by the transmission device 1 and an analog end interference cancellation and ADC are performed. Referring to FIG. 13 (a), since interference cancellation is not sufficiently performed in the analog end, signals transmitted by the transmission device 1 and the transmission device 2 are overlapped at the lower 3 bits. Referring to FIG. 13 (b), since the interference cancellation is sufficiently performed, lower 8 bits are overlapped. The overlapped bits indicate a resolution of a preferred signal.

In FIG. 13, the leftmost bit of a baseband signal corresponds to the MSB (most significant bits) and a normal MSB corresponds to a sign bit.

FDR and Reference Signal

In a wireless communication system, a distortion occurs on a symbol size and a phase due to multipath attenuation. In order to estimate and compensate the distortion, a channel estimation scheme using a reference signal is mainly used. In this case, the reference signal can be transmitted by a single terminal only for a single resource (time or frequency) instead of being transmitted by a plurality of transmission terminals at the same time.

For example, in FIG. 13, when a transmission device 1 intends to receive a signal from a transmission device 2, the transmission device 1 does not perform transmission, whereas only the transmission device 2 transmits a reference signal. If a reference signal used in a system (HDR) not using the legacy FDR and a method of transmitting the reference signal are used in a FDR system, a problem may occur.

Channel estimation is performed using a signal promised between a transmission device and a reception device. A promised signal in which information on channel quality is included is referred to as a reference signal. If a reception signal, channel information, and a transmission signal correspond to r, H, and x, respectively, it may satisfy the equation described in the following.

$$r = Hx \qquad \text{[Equation 3]}$$

A receiver is able to obtain the channel information H using the reference signal x known to both a transmitting end and a receiving end based on the reception signal r. If a frame does not include a reference signal, it may be able to calculate the transmission signal x using the channel information H and the reception signal r.

Figure 14:
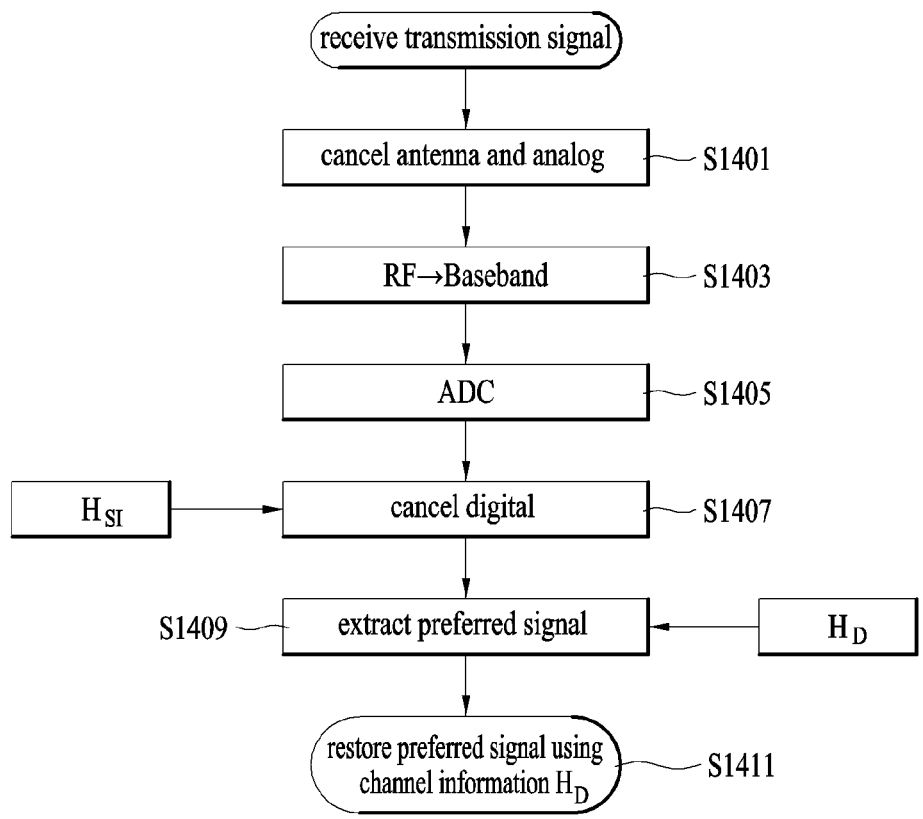
FIG. 14 is a flowchart for a process of restoring a preferred signal using channel information obtained by a legacy channel estimation scheme.

FIG. 14 is a flowchart for a process of restoring a preferred signal using channel information obtained by a legacy channel estimation scheme.

Referring to FIG. 14, in the step S1401, a signal transmitted by a base station or a different terminal is received. Subsequently, interference cancellation is performed at an antenna end using an analog scheme [S1403]. An RF signal is converted into a baseband signal [S1403] and ADC is performed on the baseband signal [S1405]. Subsequently, digital interference cancellation is performed using channel information Hsi on self-interference [S1407]. Subsequently, a preferred signal is extracted and restored using channel information Hd on the preferred signal [S1409, S1411].

In particular, if a legacy channel estimation scheme is used in the FDR system, it may be able to calculate the channel information Hsi on the self-interference and the channel information Hd on the preferred signal, respectively. Subsequently, it may be able to obtain the preferred signal using the channel information Hd.

In this case, since a size of a self-interference signal is considerably larger than a size of the preferred signal, a significant problem does not occur in the course of calculating the Hsi. Yet, as shown in FIG. 13, if the preferred signal and the self-interference are received at the same time, the size of the preferred signal occupying a quantized signal after ADC may become smaller.

As mentioned in the foregoing description, since the legacy channel estimation method is unable to reflect a quantization error due to self-interference to the preferred signal, it is necessary to have a reference signal considering self-interference and ADC and a method of transmitting the reference signal.

Method of Transmitting Reference Signal According to the Present Invention

The present invention proposes a method of transmitting a reference signal for estimating a baseband signal, which has passed through digital interference cancellation after ADC, in a FDR system at which self-interference exists. Specifically, according to the present invention, an additional reference signal is transmitted to perform channel estimation in consideration of self-interference and ADC.

Figure 15:
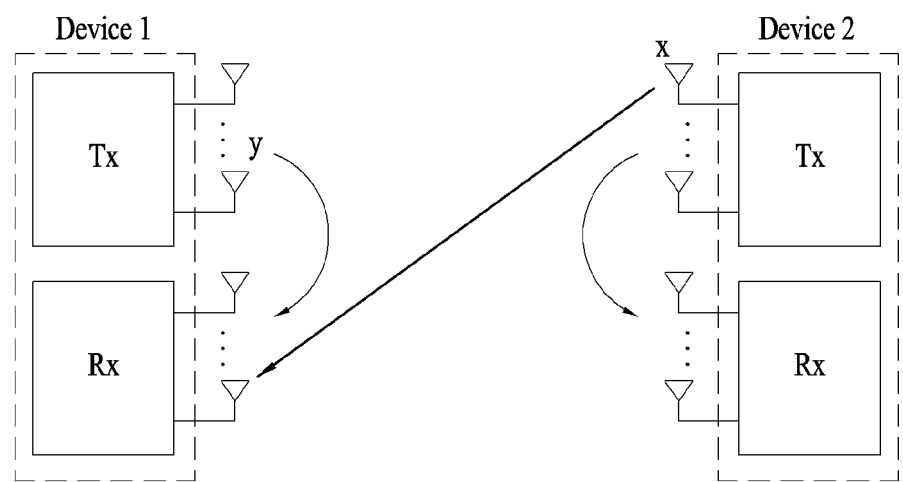
FIG. 15 illustrates an example of a transmission and reception terminal and a signal in FDR system.

FIG. 15 illustrates an example of a transmission and reception terminal and a signal in FDR system.

Referring to FIG. 15, a reception terminal and a terminal transmitting a preferred signal are configured as a device 1 and a device 2, respectively. The device 1 receives a preferred signal x from the device 2 and receives self-interference from a signal y transmitted by the device 1 itself. In the following, as shown in FIG. 15, an example that the device 1 receives a preferred signal from the device 2 and receives self-interference from a signal transmitted by the device 1 is explained, by which the present invention may be non-limited. A characteristic of the present invention is not restricted by the aforementioned environment and can be applied to various FDR systems.

Figure 16:
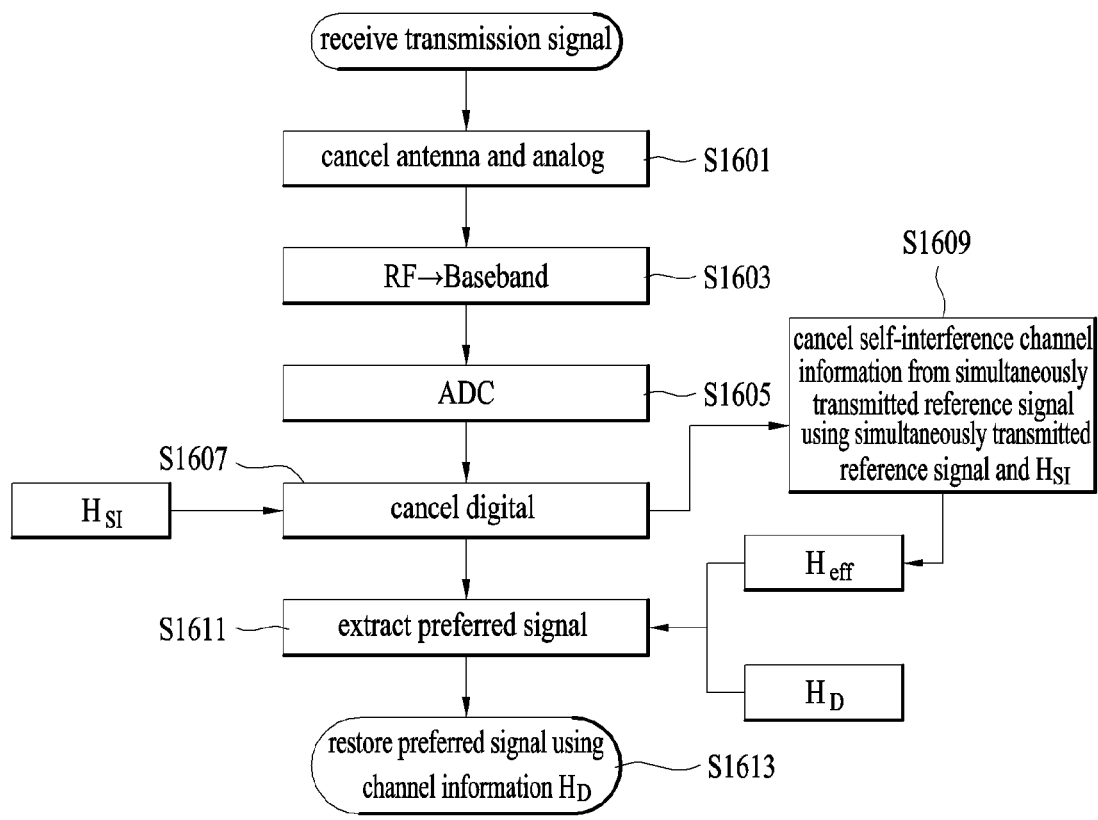
FIG. 16 is a flowchart for an example of a method of receiving a signal according to the present invention.

FIG. 16 is a flowchart for an example of a method of receiving a signal according to the present invention.

First of all, a precondition for performing a method of receiving a signal according to the present invention and a signal are defined.

A channel for a preferred signal is defined by a channel between a transmission antenna of a device 2 and digital cancellation of a device 1 and the channel is designated by Heff.

Hsi and Hd are calculated using the method mentioned earlier in FIG. 14 in a situation that a reference signal is not transmitted at the same time.

In order to obtain the Heff, a partial reference signal is transmitted at the same time by the device 1 and the device 2.

Assume that channel environment of the device 1 is very slowly changing and self-interference signal is significantly stronger than the preferred signal. Hence, it may be able to cancel self-interference channel information on the device 1 using the simultaneously transmitted reference signal and the Hsi.

Referring to FIG. 16, first of all, a device cancels interference at an analog end [S1601] and generates a baseband signal [S1603]. ADC is performed on the baseband signal [S1605] and digital cancellation is performed using Hsi [S1607]. After the digital cancellation is performed, Heff is calculated using an extracted preferred signal and a reference signal simultaneously transmitted by a device 2 irrespective of whether or not self-interference is included [S1609].

Although a self-interference signal is not completely cancelled in the digital cancelation process, since it is able to know the Heff and the Hd using the reference signal simultaneously transmitted by the device 2, it is able to extract and restore the preferred signal [S1611, S1613].

In particular, when the preferred signal is extracted after digital cancellation, it may be able to use not only the legacy Hd but also the Heff to reflect a quantization error due to self-interference to the preferred signal.

Reference Signal According to the Present Invention

In order not to make a change of transmission overhead compared to the legacy system, it may use a part of the legacy reference signals as a reference signal to be simultaneously transmitted. And, as a method of enhancing performance while increasing transmission overhead, it may be able to newly define a reference signal to be simultaneously transmitted as well as a legacy reference signal. In the following, a reference signal according to the present invention is illustrated using a CRS and a DM-RS as a representative reference signal in LTE. Yet, the reference signal according to the present invention is not restricted by the CRS and the DM-RS. If a part of a legacy reference signal is used as a reference signal to be simultaneously transmitted, it may be able to arrange any reference signal.

Figure 17:
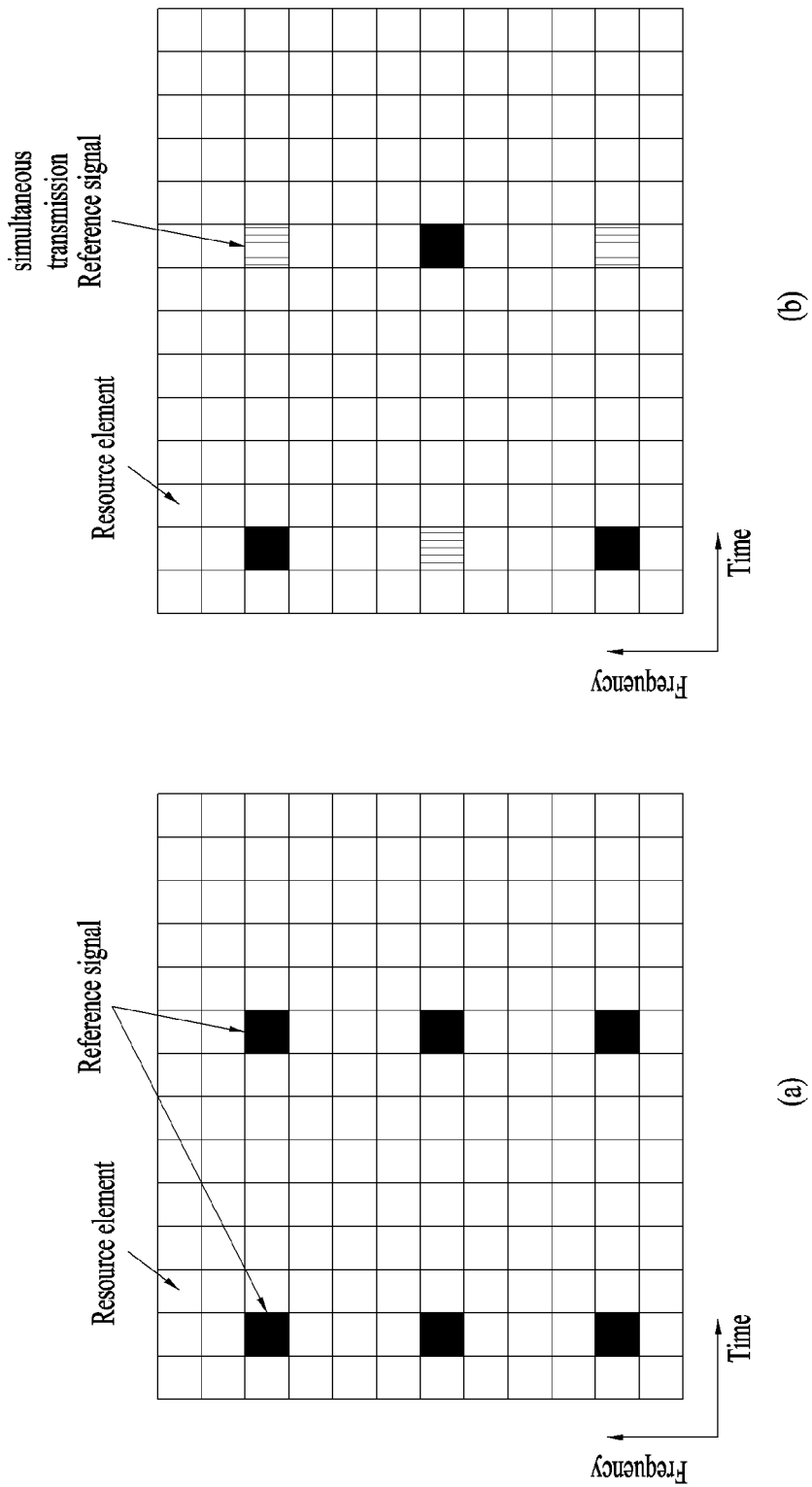
FIG. 17 illustrates a legacy CRS and a reference signal according to the present invention.

FIG. 17 illustrates a legacy CRS and a reference signal according to the present invention.

Referring to FIG. 17, a part of legacy CRS reference signals can be used as a reference signal to be simultaneously transmitted. In particular, if a legacy reference signal is used, it may have a merit in that transmission overhead does not increase. FIG. 17 (a) illustrates a legacy CRS in case of 2 antenna ports.

FIG. 17 (b) illustrates an example that a simultaneously transmitted reference signal according to the present invention and a not simultaneously transmitted reference signal are configured to be close to a frequency axis and a time axis as close as possible. In this case, it is preferable to make Heff to be similar to Hsi and Hd information as similar as possible. And, the reference signal according to the present invention is not restricted by the structure of the reference signal shown in FIG. 17 (b). If a part of reference signals is used as a reference signal to be simultaneously transmitted, it can be applied to various legacy reference signals.

Figure 18:
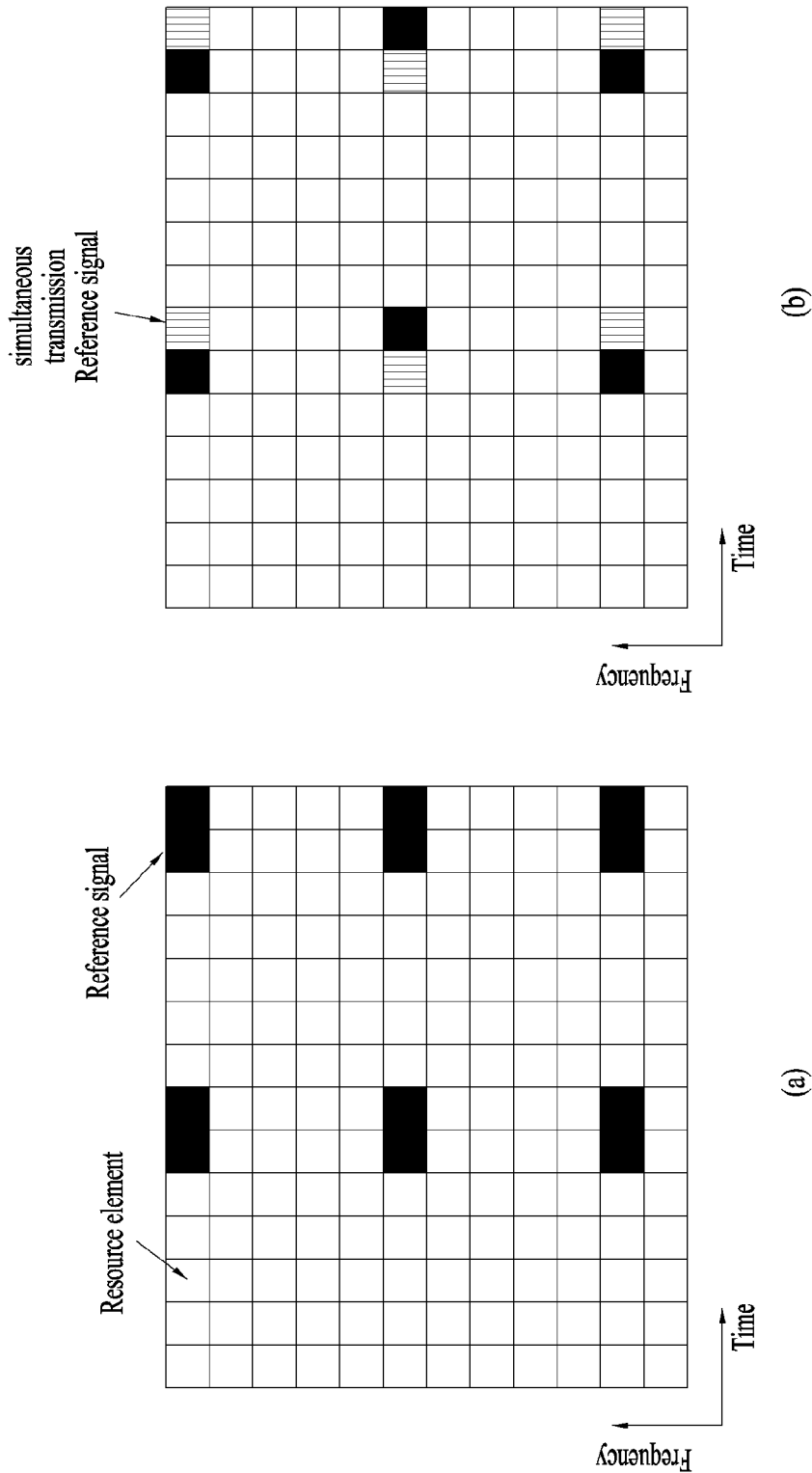
FIG. 18 illustrates a legacy DM-RS and a reference signal according to the present invention

FIG. 18 illustrates a legacy DM-RS and a reference signal according to the present invention.

Similar to the CRS mentioned earlier in FIG. 17, a part of DM-RS corresponding to a legacy reference signal can also be used as a reference signal to be simultaneously transmitted. FIG. 18 (a) illustrates an example of a legacy DM-RS in case of 2 antenna ports.

FIG. 18 (b) illustrates an example that a simultaneously transmitted reference signal according to the present invention and a not simultaneously transmitted reference signal are configured to be close to a frequency axis and a time axis as close as possible. In this case, it is preferable to make Heff to be similar to Hsi and Hd information as similar as possible.

And, the reference signal according to the present invention is not restricted by the structure of the reference signal shown in FIG. 18 (b). If a part of reference signals is used as a reference signal to be simultaneously transmitted, it can be applied to various legacy reference signals.

Figure 19:
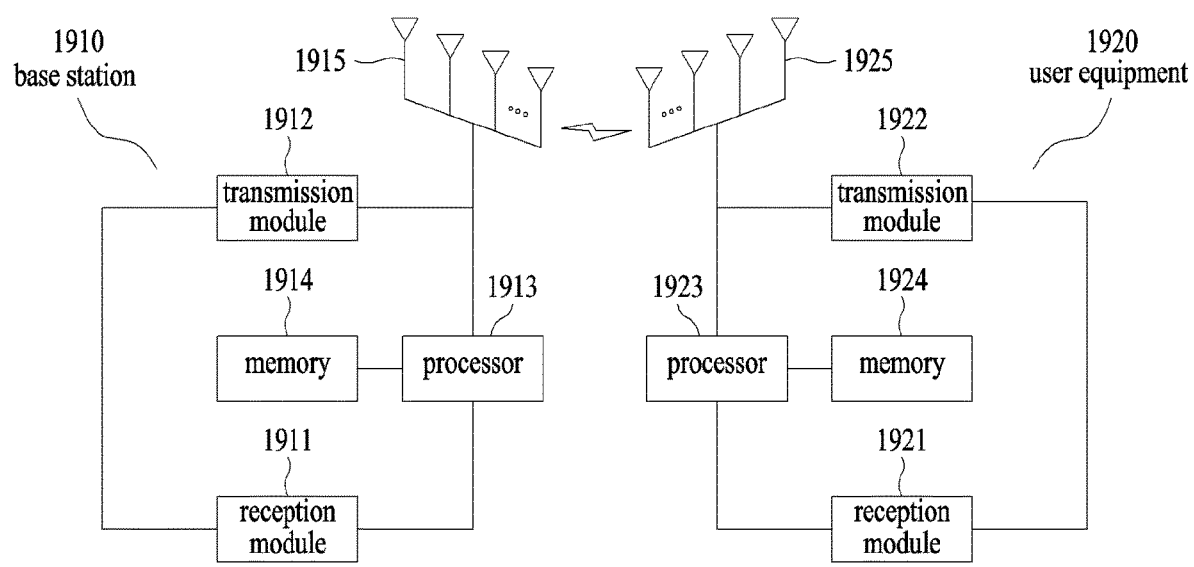
FIG. 19 illustrates a base station and a user equipment applicable to one embodiment of the present invention.

FIG. 19 illustrates a base station and a user equipment applicable to one embodiment of the present invention.

If a relay is included in a wireless communication system, communication is performed between a base station and the relay in a backhaul link and communication is performed between the relay and a user equipment in an access link. Hence, the base station and the user equipment shown in the drawing can be replaced with the relay in accordance with a situation.

Referring to FIG. 19, a wireless communication system includes a base station 1910 and a user equipment 1920. The base station 1910 includes a processor 1913, a memory 1914 and a radio frequency (RF) unit 1911/1912. The processor 1913 can be configured to implement a procedure and/or methods proposed by the present invention. The memory 1914 is connected with the processor 1913 and stores various information associated with operations of the processor 1913. The RF unit 1916 is connected with the processor 1913 and transmits and/or receives a radio signal. The user equipment 1920 includes a processor 1923, a memory 1924 and a radio frequency (RF) unit 1921/1922. The processor 1923 can be configured to implement a procedure and/or methods proposed by the present invention. The memory 1924 is connected with the processor 1923 and stores various information associated with operations of the processor 1923. The RF unit 1921/1922 is connected with the processor 1923 and transmits and/or receives a radio signal. The base station 1910 and/or the user equipment 1920 can include a single antenna or multiple antennas. The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application. In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'base station' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above detailed description is therefore to be construed in all aspects as illustrative and not restrictive. The scope of the invention should be determined by reasonable interpretation of the appended, and all changes coming within the meaning and equivalency range of the appended claims are to be embraced therein. Claims that are not explicitly cited in the appended claims may be presented in combination as an exemplary embodiment of the present invention or included as a new claim by subsequent amendment after the application is filed.

INDUSTRIAL APPLICABILITY

The present invention is applicable to wireless communication devices such as a UE, a relay, and an eNB.

What is claimed is:

1. A method of receiving data by a first device from a second device in a wireless access system supporting full duplex radio (FDR) transmission, the method comprising:
receiving a first reference signal for first channel information ($H_D$) from the second device, wherein the first device is configured not to transmit any signal while the second device transmits the first reference signal;
calculating the first channel information ($H_D$) using the first reference signal;
receiving a second reference signal for second channel information ($H_{SI}$) from the first device itself, based on the second device being configured not to transmit any signal while the first device transmits the second reference signal;
calculating the second channel information ($H_{SI}$) using the second reference signal;
receiving a third reference signal simultaneously from both of the second device and the first device itself;
calculating third channel information ($H_{eff}$) from which self-interference is cancelled based on the first channel information ($H_D$), the second channel information ($H_{SI}$) and the third reference signal; and
receiving the data using the third channel information ($H_{eff}$),
wherein the third reference signal is received on less than all of the resources in which a common reference signal (CRS) or a demodulation reference signal (DM-RS) is received.

2. The method of claim 1, further comprising the steps of:
receiving a UE capability request message; and
transmitting a UE capability information message containing a field indicating whether or not the FDR transmission is supported.

3. A user equipment (UE) operating as a first device receiving data from a second device in a wireless access system supporting full duplex radio (FDR) transmission, the UE comprising:
  a transceiver; and
  a processor configured to:
  control the transceiver to receive a first reference signal for first channel information ($H_D$) from the second device,
  control the transceiver not to transmit any signal while the second device transmits the first reference signal,
  calculate the first channel information ($H_D$) using the first reference signal,
  control the transceiver to receive a second reference signal for second channel information ($H_{SI}$) from the first device itself, based on the second device being configured not to transmit any signal while the first device transmits the second reference signal,
  calculating the second channel information ($H_{SI}$) using the second reference signal,
  control the transceiver to receive a third reference signal simultaneously from both of the second device and the first device itself,
  calculate third channel information ($H_{eff}$) from which self-interference is cancelled based on the first channel information ($H_D$), the second channel information ($H_{SI}$) and the third reference signal, and
  control the transceiver to receive the data using the third channel information ($H_{eff}$),
  wherein the third reference signal is received on less than all of the resources in which a common reference signal (CRS) or a demodulation reference signal (DM-RS) is received.

4. The UE of claim 3, wherein the processor is further configured to control the transceiver to:
  receive a UE capability request message; and
  transmit a UE capability information message containing a field indicating whether or not the FDR transmission is supported.

5. A computer-readable medium comprising code portions which, when executed on a processor of a first device, configure the processor to perform the steps comprising:
  receiving a first reference signal for first channel information ($H_D$) from a second device, wherein the first device is configured not to transmit any signal while the second device transmits the first reference signal;
  calculating the first channel information ($H_D$) using the first reference signal;
  receiving a second reference signal for second channel information ($H_{SI}$) from the first device itself, based on the second device being configured not to transmit any signal while the first device transmits the second reference signal;
  calculating the second channel information ($H_{SI}$) using the second reference signal;
  receiving a third reference signal simultaneously from both of the second device and the first device itself;
  calculating third channel information ($H_{eff}$) from which self-interference is cancelled based on the first channel information ($H_D$), the second channel information ($H_{SI}$) and the third reference signal; and
  receiving the data using the third channel information ($H_{eff}$),
  wherein the third reference signal is received on less than all of the resources in which a common reference signal (CRS) or a demodulation reference signal (DM-RS) is received.

6. The computer-readable medium of claim 5, further comprising the steps of:
  receiving a UE capability request message; and
  transmitting a UE capability information message containing a field indicating whether or not a full duplex radio (FDR) transmission is supported.

* * * * *